United States Patent [19]
Fukuyama et al.

[11] Patent Number: 4,726,436
[45] Date of Patent: Feb. 23, 1988

[54] MEASURING EQUIPMENT

[75] Inventors: Hiroshi Fukuyama; Yasuo Suzuki; Shigeru Yoshida; Hirohide Taguchi, all of Tokyo, Japan

[73] Assignee: Bridgestone Corporation, Tokyo, Japan

[21] Appl. No.: 849,238

[22] Filed: Apr. 7, 1986

[30] Foreign Application Priority Data

Apr. 9, 1985 [JP] Japan ................................. 60-074747
Aug. 19, 1985 [JP] Japan ................................. 60-181296

[51] Int. Cl.⁴ ........................ G01G 3/14; G01G 19/02; G01L 1/22
[52] U.S. Cl. .................................. 177/211; 177/134; 73/862.66
[58] Field of Search ............................... 177/134, 211; 73/862.66

[56] References Cited
U.S. PATENT DOCUMENTS

| | | | |
|---|---|---|---|
| 3,935,914 | 2/1976 | Nordstrom et al. | 177/134 |
| 4,453,607 | 6/1984 | Zink | 177/211 X |
| 4,554,987 | 11/1985 | Dillon | 177/134 |
| 4,574,899 | 3/1986 | Griffin | 177/211 |
| 4,600,066 | 7/1986 | Griffin et al. | 177/211 |

Primary Examiner—George H. Miller, Jr.
Attorney, Agent, or Firm—Jordan and Hamburg

[57] ABSTRACT

A measuring equipment comprising a single plate-like structure of which the central and peripheral portions are linked by beams at a minimum of 4 places. The central portion of the single plate-like structure is a board to which a load is to be applied, and pairs of strain gauges, each provided with 2 resistors, are attached on the top and bottom faces or the side faces, respectively, of each beam. A load applied to the loading board is detected as strain by the strain gauges at each beam which provide electrical outputs for indicating load.

5 Claims, 9 Drawing Figures

MEASURING EQUIPMENT

BACKGROUND OF THE INVENTION

1. Field of the Invention

The present invention relates to a measuring equipment suitably usable for weighing an automobile, and for measurement of a force which moves an automobile and an airplane etc. when applied with a wind pressure within a wind tunnel, namely, a load applied to the automobile in the horizontal direction.

2. Description of the Prior Art.

Heretofore, measuring equipment using load cells has been used to detect as electrical signal the load applied thereto.

The majority of the conventional measuring equipment is as heavy as 30 to 40 kg, and so cannot easily be relocated. Also the load is not uniformly applied to the load cells used in such measuring equipment, and therefore the measurement error due to such an unblanced load is large. More particularly, the measuring equipment used in the test on an automobile in a wind tunnel is liable to be erroneous since the equipment itself is subject to the wind resistance, and also it is very expensive. Further a such prior-art measuring equipment using load cells cannot provide accurate data because the load cells are resonant with each other as the wind pressure varies; consequently, it is necessary to use a computer in order to effect an extremely complicated and troublesome data processing.

Also in simply weighing an automobile, a conventional measuring equipment using a load cell at each of the four corners between the upper and lower steel plates shows a large measurement error due to unbalanced load since the load is not uniformly applied to these four load cells. The load cells themselves being about 8 to 10 cm high, the thickness of the whole measuring equipment is about 10 to 15 cm, so that it is difficult to have the automobile got on the upper steel plate. To facilitate this placement of the automobile onto the upper steel plate, a separate slope block must be used with the equipment. Furthermore, the load cells are very expensive, so that the manufacturing cost of the whole equipment is correspondingly high. Since the load cells are fixed to the lower steel plate alone, the upper steel plate above the load cells is liable to wobble during transportation, so it may possibly damage the load cells.

SUMMARY OF THE INVENTION

Accordingly, the present invention has an object to overcome the above-mentioned drawbacks of the prior art by providing a measuring equipment which is designed lightweight and compact by reducing the total thickness in order to minimize the influence of the wind, improved in measuring accuracy, less expensive and more sturdy.

The above object is attained by providing a measuring equipment, according to the present invention, comprising a single plate-like structure (1 piece pad structure) of which the central and the peripheral portions are linked by beams at a minimum of 4 places, the central portion being designed to be a board to which a load is to be applied, and strain gauges in pairs each provided with at least 2 resistors and which are attached on the top and bottom faces, respectively, of each beam, the load applied to the loading board being detected as strain by the strain gauge at each beam and electrically amplified for indication. Also, for measuring a vertical load, that is, the weight of a vehicle, a measuring equipment is provided, according to the present invention, comprising a single plate-like structure of which the central and peripheral portions are linked by beams at a minimum of 4 places, the central portion being designed to be a board to which a load is to be applied, and strain gauges in pairs each provided with at least 2 resistors and which are attached on the side faces, respectively, of each beam, the load applied to the loading board being detected as strain by the strain gauge at each beam and electrically amplified for indication. The strain gauges detect a shearing strain in the beams.

These and other objects and advantages of the present invention will be better understood from the ensuing description, made by way of example, of the preferred embodiments of the present invention with reference to the drawings.

DETAILED DESCRIPTION OF THE PREFERRED EMBODIMENTS

Figure 1:
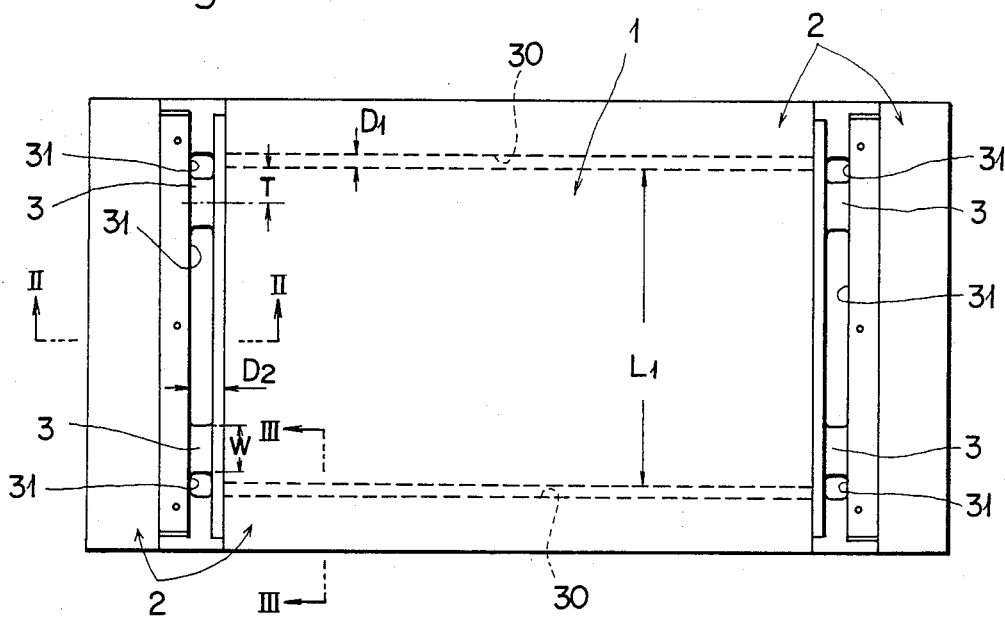
FIG. 1 is a plan view of a preferred embodiment of the present invention.
Figure 2:
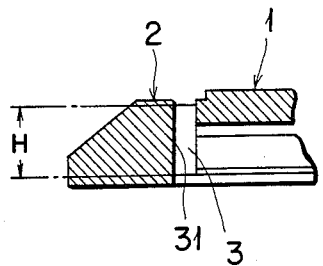
FIG. 2 is a sectional view taken along the line I—I in FIG. 1.
Figure 3:
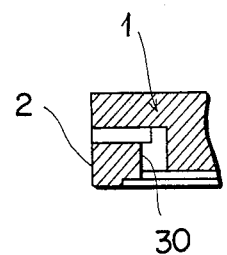
FIG. 3 is a sectional view taken along the line III—III in FIG. 1.

Referring now to FIG. 1, the central portion and peripheral portions 2 of a plate-like structure are linked to each other by means of a beam 3 one at each of four places, and the central portion is formed into a board 1 to which a load is to be applied. The loading board 1 has formed therein horizontal recesses 30 and vertical recesses 31 to form the four beams 3. Thus, the loading board 1 seems to be held in air by means of the four beams 3 protruding from the peripheral portions 2. When the loading board 1 is applied a horizontal load, a strain develops in each of the beams 3. The strain in the beam 3 is detected as electrically amplified by a strain gauge 4 to measure the horizontal weight. In the embodiment shown in FIG. 1, the lateral side of the loading board 1 overhangs and covers the peripheral portion 2 at the lateral edge as shown in FIG. 3, which facilitates the riding of a vehicle onto the loading board 1.

Figure 5:
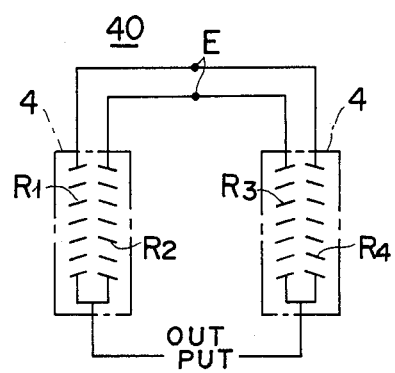
FIG. 5 shows two strain gauges in pair attached to a beam.
Figure 6:
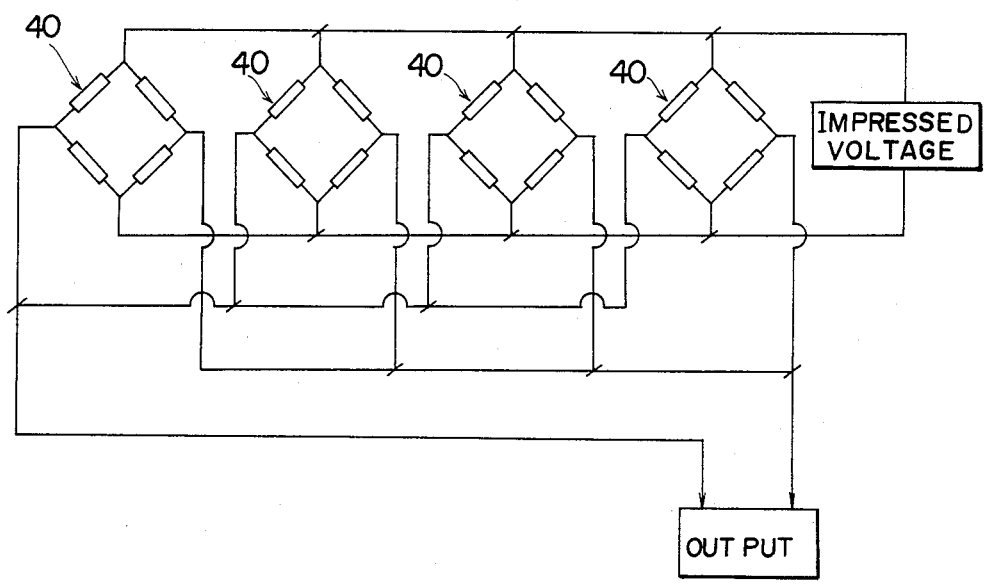
FIG. 6 is a connection diagram of the strain gauges.
Figure 7:
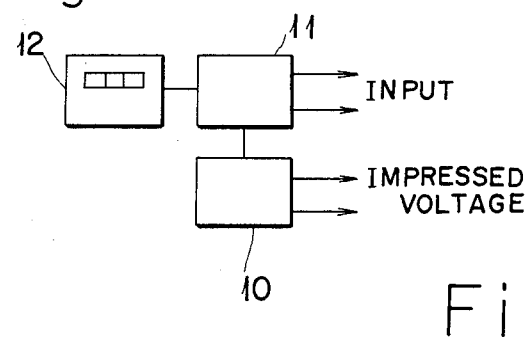
FIG. 7 is a block diagram.

There is provided on either of the top and bottom faces of each of the four beams 3 a strain gauge 4 with two resistors as will be described later. Namely, a total of 8 strain gauges are used. Each of the four beams 3 has attached thereon a pair of strain gauges 4. That is to say, a separate strain gauge 4 is mounted on top and bottom faces of each beam 3 the pair of strain gauges of each beam forming together a strain gauge pair 40 as shown in FIG. 5. Each of the two strain gauges 4 in a pair is provided with two resistors, e.g., R1 and R2, and R3 and R4, respectively. These resistors are placed each with an angle of 45° with respect to the loading direction. The pairs 40 of strain gauges are provided on the four beams 3, respectively, and wired as shown in FIG. 6. A predetermined voltage (for example, 3 volts) is applied to each pair 40 of strain gauges, and when a horizontal load acts on the loading board 1, the mean value of the sum of the voltages provided from the four pairs 40 of strain gauge is delivered as an output after being amplified by an amplifier 11, and digitally indicated in an indicator 12 as shown in FIG. 7. In FIG. 7, the reference numeral 10 denotes a power supply, the amplifier 11, and 12 the indicator.

Figure 4:
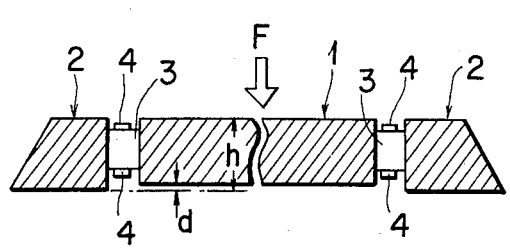
FIG. 4 is a schematic sectional view showing the provision of strain gauges.

The distance T from the edge of the loading board 1 to the center of the beam 3 is designed to be equal to or less than 4/L1. The width D2 of the recess 31 is equal to or larger than that D1 of the recess 30 (namely, D1≦D2). Furthermore, as shown in FIG. 4, the clearance d at the bottom of the leading board 1 is designed to be equal to or less than h/2. The height H of the beam 3 is larger than the half width W/2 of the beam 3 and the height H is smaller than 3W (namely, W/2<H<3W).

The material of the plate-like structure forming the entire loading board may be steel plate, aluminum, duralumin, ceramic, plastic or the like. The maximum height of the loading board may be on the order of 5 cm, and although it depends on the material used, the weight of the board is less than a half of that of the measuring equipment using the load cells even if the loading board is made of a steel plate.

It should be noted that more than four beams 3 may be used and that more than one pair 40 including two strain gauges attached on the top and bottom faces, respectively, of each beam 3 and which is provided with four resistors may be used.

In the foregoing, description has been made of the measuring equipment only for horizontal weight; however, the strain gauge 4 may be attached on either of the side faces of each beam 3 to detect and display as an amount of strain at each beam 3 a load applied to the loading board 1 from above. With strain gauges 4 attached on the top and bottom faces as well as on the side faces of each beam 3, both a load applied from above and a one applied horizontally can be measured. Namely, this arrangement of strain gauges permits a biaxial measurement.

As described above, the measuring equipment of the invention comprises a single plate-like structure of which the central and peripheral portions are linked by beams at a minimum of 4 places, the central portion being designed to be a board to which a load is to be applied, and strain gauges in pairs, each provided with at least 2 resistors, are attached on the top and bottom faces respectively, of each beam. The load applied to the loading board is detected as strain by the strain gauges at each beam and electrically amplified for indication. Thus, no load cells now necessary, allowing the reduction of the thickness of the equipment as a whole. Since a strain gauge is attached on each of the top and bottom faces of each beam, measurement can be done with less error as compared with any equipment having a strain gauge attached on only one of the top and bottom faces. Also, any unbalanced load will not cause any large measurement error, which leads to an improved accuracy of measurement. Since the equipment as a whole can be thin, no special slope block is necessary for taking the automobile onto the loading board. Also, the loading board itself functioning as load cell, its whole structure may be integrally built and thus it is not easily damaged. Especially since the loading board is designed totally more compact and thinner, the measuring equipment of the invention when used in testing on an automobile within a wind tunnel is not easily affected by the wind pressure, which assures the accuracy of the measured data. Furthermore, the measuring equipment of the invention can be manufactured with a considerably reduced cost as compared with the conventional equipment, and also the lightweight design permits relocation of the equipment easily to anywhere.

Figure 8:
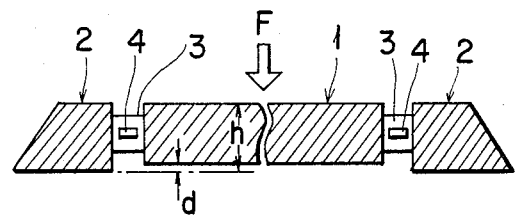
FIG. 8 is a schematic sectional view showing the provision of strain gauges in another preferred embodiment of the present invention.

According to another embodiment of the present invention, the strain gauges 4 are attached on the side faces of each beam 3 as shown in FIG. 8, the other arrangement being the same since in the first embodiment. In the second embodiment, as a load acts on the loading board 1 from above, a shearing strain develops in the beam 3 and it is detected by the strain gauges 4. The amount of strain is detected as electrically amplified to measure the weight or load acting on the loading board 1.

Figure 9:
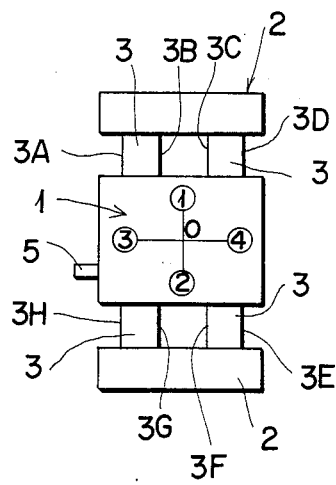
FIG. 9 is a plan view showing the loading points in the measurement.

As shown in FIG. 9, a strain gauge 4 is attached at each of the eight side faces 3A to 3H of the beams 3, and the strain gauges 4 on the opposite side faces of a beam 3 form together a strain gauge pair 40.

The experimental measurement results were as shown in Table 1. These data in Table 1 are the results from application of 500 kg to each of the points 0 and ① to ④ on the loading board 1.

In FIG. 9, the reference numeral 5 indicates a connector.

TABLE 1

| Loading Point | Rotation | Strain gauges at 8 places | | |
|---|---|---|---|---|
| | | Kg | Difference (Kg) | Error (%) |
| 0 | 1 | 500 | — | — |
| | 2 | 500.2 | 0.2 | 0.04 |
| | 3 | 499.8 | −0.2 | −0.04 |
| ① | 1 | 499.3 | −0.7 | −0.14 |
| | 2 | 499.5 | −0.5 | −0.10 |
| | 3 | 499.3 | −0.7 | −0.14 |
| ② | 1 | 500 | 0 | 0 |
| | 2 | 500.3 | 0.3 | 0.06 |
| | 3 | 500.3 | 0.3 | 0.06 |
| ③ | 1 | 503.1 | 3.1 | 0.62 |
| | 2 | 503.4 | 3.4 | 0.68 |
| | 3 | 503.3 | 3.3 | 0.66 |
| ④ | 1 | 497.9 | −2.1 | −0.42 |
| | 2 | 497.8 | −2.2 | −0.44 |
| | 3 | 497.9 | −2.1 | −0.42 |

With the second embodiment, the maximum error is 0.68% when the load is applied to the point ③ on the loading board 1.

The results of measurement obtained with a strain gauge 4 placed at each of the four side faces 3A, 3D, 3E and 3H of the beams 3 as directed horizontally and vertically, respectively, are shown in Tables 2 and 3, respectively. The maximum errors of measurement are 3.22% and 3.46%, respectively.

TABLE 2

| Loading Point | Rotation | Strain gauges at 4 places (as directed horizontally) | | |
|---|---|---|---|---|
| | | Kg | Difference (Kg) | Error (%) |
| 0 | 1 | 500 | — | — |
| | 2 | 499.6 | −0.4 | −0.08 |
| | 3 | 499.8 | −0.2 | −0.04 |

TABLE 2-continued

| Loading Point | Rotation | Strain gauges at 4 places (as directed horizontally) | | |
|---|---|---|---|---|
| | | Kg | Difference (Kg) | Error (%) |
| ① | 1 | 489.1 | −10.9 | −2.18 |
| | 2 | 489.1 | −10.9 | −2.18 |
| | 3 | 488.9 | −11.1 | −2.22 |
| ② | 1 | 496.0 | −4.0 | −0.80 |
| | 2 | 496.4 | −3.6 | −0.72 |
| | 3 | 496.4 | −3.6 | −0.72 |
| ③ | 1 | 516.1 | 16.1 | 3.22 |
| | 2 | 515.7 | 15.7 | 3.14 |
| | 3 | 515.3 | 15.3 | 3.06 |
| ④ | 1 | 501.6 | 1.6 | 0.32 |
| | 2 | 501.0 | 1.0 | 0.20 |
| | 3 | 501.0 | 1.0 | 0.20 |

TABLE 3

| Loading Point | Rotation | Strain gauges at 4 places (as directed vertically) | | |
|---|---|---|---|---|
| | | Kg | Difference (Kg) | Error (%) |
| 0 | 1 | 500 | — | — |
| | 2 | 500.2 | 0.2 | 0.04 |
| | 3 | 500.2 | 0.2 | 0.04 |
| ① | 1 | 488.9 | −11.1 | −2.22 |
| | 2 | 488.5 | −11.5 | −2.30 |
| | 3 | 488.7 | −11.3 | −2.26 |
| ② | 1 | 495.6 | −4.4 | −0.88 |
| | 2 | 495.6 | −4.4 | −0.88 |
| | 3 | 495.4 | −4.6 | −0.92 |
| ③ | 1 | 517.3 | 17.3 | 3.46 |
| | 2 | 516.7 | 16.7 | 3.34 |
| | 3 | 515.3 | 15.3 | 3.06 |
| ④ | 1 | 500.2 | 0.2 | 0.04 |
| | 2 | 499.8 | −0.2 | −0.04 |
| | 3 | 500 | 0 | 0 |

Also in the second embodiment, the material of the plate-like structure forming the entire loading board may be steel plate, aluminum, duralumin, ceramic, plastic or the like. The maximum height of the loading board may be on the order of 5 cm, and although it depends on the material use, the weight of the board is less than a half of that of the conventional measuring equipment even if the loading board is made of a steel plate.

It should also be noted that more than four beams 3 may be used and that more than one pair 40 including two strain gauges attached on the side faces, respectively, of each beam 3 and which is provided with four resistors may be used.

As described above, the second embodiment of the present invention comprises a single plate-like structure of which the central and peripheral portions are linked by beams at a minimum of 4 places, the central portion being designed to be a board to which a load is to be applied, and strain gauges in pairs each provided with at least 2 resistors, are attached to the side faces, respectively, of each beam. The load applied to the loading baoard is detected as strain by the strain gauge at each beam and electrically amplified for indication. Therefore, no load cells are required in the measuring equipment of the invention, thereby permitting reduction of the thickness of the equipment as a whole. Since a strain gauge is attached on either of the side faces of each beam, measurement can be done with less error as compressed with any equipment having a strain gauge attached on only one of the side faces. Also, any unbalanced load will not cause any large measurement error, which leads to an improved accuracy of measurement. Since the equipment as a whole can be made thin, no special sloping block is necessary for taking the automobile onto the loading board. Also, the loading board itself functioning as load cell, its whole structure may be integrally built and thus it is not easily damaged. Also, since the measuring equipment of the invention uses no load cells, it can be manufactured with reduced costs. And its lightweight design permits the fast relocation of the equipment to anywhere.

What is claimed is:

1. A measuring equipment, comprising:
   a single plate-like structure having an integrally constructed central portion and an integrally constructed peripheral portion, said central and peripheral portions being separately positioned and horizontally linked to each other by means at a minimum of 4 places, said central portion comprising a loading board for receiving a load to be measured, said peripheral portion as a whole serving as a load supporting part; and
   first and second strain gauges, each provided with at least two resistors, attached on the top and bottom faces, respectively, of each beam, whereby a horizontal load applied to the loading board is detected as shearing strain by the strain gauges at each beam and said strain gauges have electrical outputs for indicating horizontal load.

2. A measuring equipment as set forth in claim 1, wherein said loading board overhangs and covers at least a part of the peripheral portion.

3. A measuring equipment, comprising:
   a single plate-like structure having an integrally constructed central portion and an integrally constructed peripheral portion, said central and peripheral portions being separately positioned and horizontally linked to each other by beams at a minimum of 4 places, said central portion comprising a loading board for receiving a load to be measured, said peripheral portion as a whole serving as a load supporting part; and
   first and second strain gauges, each provided with at least two resistors, attached on opposite side faces, respectively, of each beam, whereby a vertical load applied to the loading board is detected as shearing strain by the strain gauges at each beam and said strain gauges have electrical outputs for indicating vertical load.

4. A measuring equipment as set forth in claim 3, wherein said loading board overhangs and covers at least a part of the peripheral portion.

5. A measuring equipment, comprising:
   a single plate-like structure having an integrally constructed central portion and an integrally constructed peripheral portion, said central and peripheral portions being separately positioned and horizontally linked to each other by beams at a minimum of 4 places, said central portion comprising a loading board for receiving a load to be measured, said peripheral portion as a whole serving as a load supporting part;
   first and second shearing strain gauges, each provided with at least two resistors, attached on the top and bottom faces, respectively, of each beam;
   third and fourth shearing strain gauges, each also provided with at least two resistors, attached on opposite side faces, respectively, of each beam;
   wherein a load applied to the loading board is detected as shearing strain by the strain gauges on each beam and said strain gauges have electrical outputs for indicating load.

* * * * *